(12) United States Patent
Determan et al.

(10) Patent No.: US 8,957,956 B2
(45) Date of Patent: Feb. 17, 2015

(54) METHOD AND SYSTEM FOR IRIS IMAGE CAPTURE

(75) Inventors: Gary Edward Determan, Maple Grove, MN (US); Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 947 days.

(21) Appl. No.: 12/797,355

(22) Filed: Jun. 9, 2010

(65) Prior Publication Data

US 2011/0304721 A1 Dec. 15, 2011

(51) Int. Cl.
*H04N 7/18* (2006.01)
*H04N 5/232* (2006.01)

(52) U.S. Cl.
CPC ................... *H04N 5/23212* (2013.01)
USPC ............................................. 348/78

(58) Field of Classification Search
USPC ............ 348/65, 78, 207.99; 396/18, 95; 351/207; 382/294; 345/474
See application file for complete search history.

(56) References Cited

U.S. PATENT DOCUMENTS

| | | | |
|---|---|---|---|
| 7,120,286 B2 * | 10/2006 | Yu et al. | 382/145 |
| 8,576,235 B1 * | 11/2013 | Sumner et al. | 345/474 |
| 2005/0084179 A1 * | 4/2005 | Hanna et al. | 382/294 |
| 2006/0098097 A1 * | 5/2006 | Wach et al. | 348/207.99 |
| 2007/0057211 A1 * | 3/2007 | Bahlman et al. | 250/584 |
| 2007/0279590 A1 * | 12/2007 | Ebisawa | 351/208 |
| 2010/0034529 A1 * | 2/2010 | Jelinek | 396/95 |
| 2010/0128221 A1 * | 5/2010 | Muller et al. | 351/207 |

FOREIGN PATENT DOCUMENTS

| | | |
|---|---|---|
| EP | 1241634 A2 | 9/2002 |
| EP | 2151900 A1 | 2/2010 |

OTHER PUBLICATIONS

"European Application Serial No. 11168691.1, European Search Report mailed Nov. 19, 2012", 3 pgs.

* cited by examiner

*Primary Examiner* — Y Lee
*Assistant Examiner* — Salame Amr
(74) *Attorney, Agent, or Firm* — Schwegman Lundberg & Woessner, P.A.

(57) ABSTRACT

According to one example embodiment, a process and system include a camera used to capture a sequence of illuminated images of an subject, wherein the images are stored in frames. The focus point is changed for each image captured so that the focus point sweeps from a far to a near end of a sweep range, in discrete steps or continuous motion, so that successive images have slightly overlapping depths of field. The sweep range and overlapping depths of field provide that at least one image is well focused on the iris of the eye of the subject. In one other example embodiment, one or more of the images are illumined with a illumination fired for a respective captured image. In another embodiment, the sweep range is determined at least in part using a range finder or is otherwise controlled to determine a position of the subject so that the sweep range starts and stops a desired distance in front of and behind the subject, respectively.

20 Claims, 5 Drawing Sheets

METHOD AND SYSTEM FOR IRIS IMAGE CAPTURE

TECHNICAL FIELD

This technology relates to methods for processing biometric images, and in particular for addressing image quality issues relating to out-of-focus blur.

BACKGROUND

Iris recognition is a method of biometric authentication that uses pattern recognition techniques based on high-resolution images of the irises of an individual's eyes. Iris recognition uses camera technology, typically employing near infrared (NIR) illumination to see through the iris coloration, to create images of the detail-rich, intricate structures of the iris. Converted into digital templates, these images provide mathematical representations of the iris that yield unambiguous positive identification of an individual.

One problem with iris recognition is that focusing is extremely difficult when accurately capturing near infrared (NIR) iris images. To get iris features with dark eyes NIR illumination and sensors are used. Due to the NIR the sensor is not as efficient compared to visible so there needs to be more illumination. Even with intense illumination the camera aperture setting is often such that the depth of field is short, which is a major factor in capturing images that are not in focus. Autofocusing does not work because the iris can be located anywhere within the operating range of the iris camera and because the camera lens has a very small depth of field.

BRIEF DESCRIPTION OF THE DRAWINGS

The accompanying figures, in which like reference numerals refer to identical or functionally-similar elements throughout the separate views and which are incorporated in and form a part of the specification, further illustrate the present technology and, together with the detailed description of the technology, serve to explain the principles of the present technology.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of systems and methods are illustrated in the various views, those skilled in the art will recognize that many of the examples provided have suitable alternatives that can be utilized.

Figure 1:
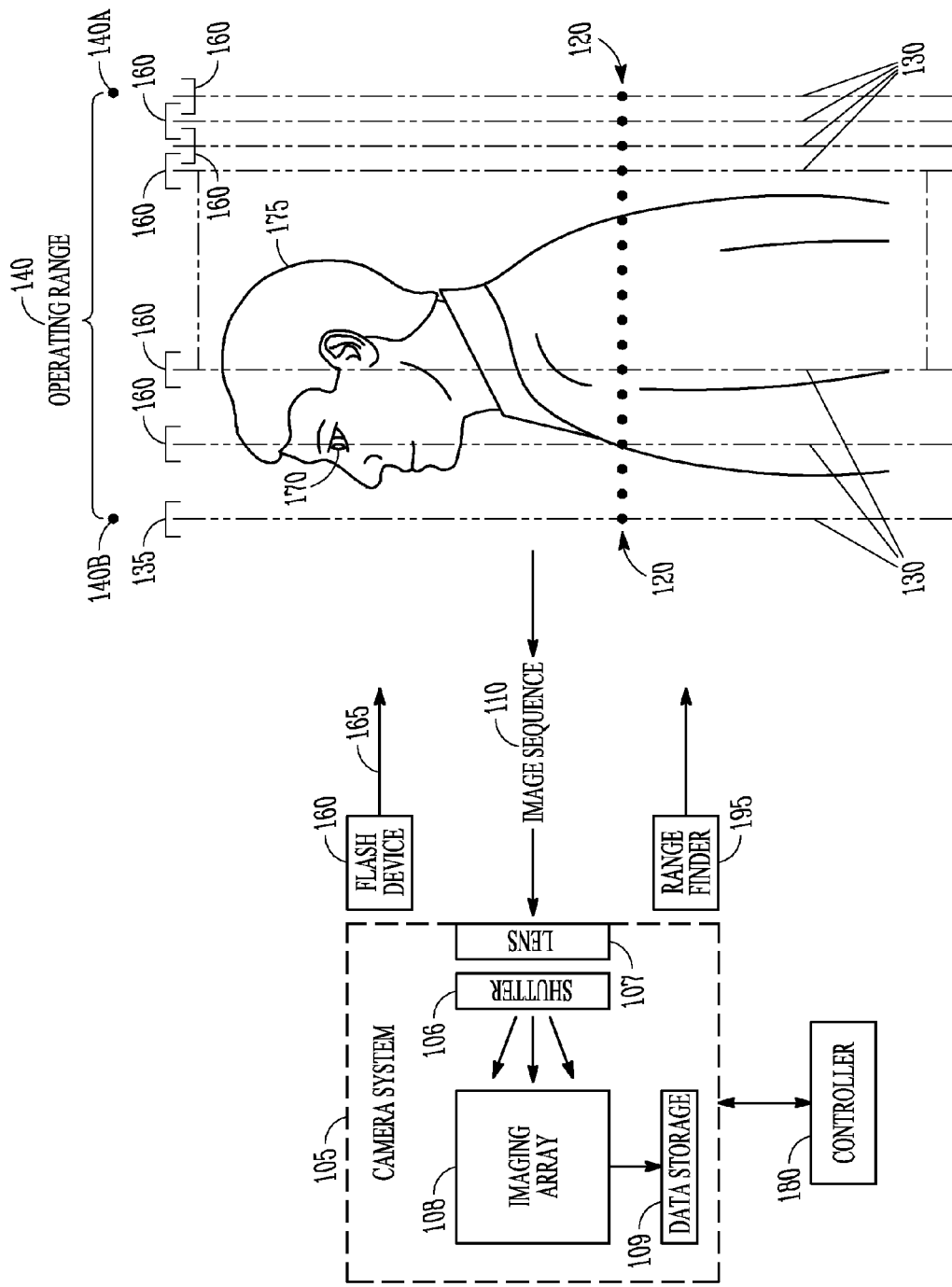
FIG. 1 illustrates an iris image capture system, method, and computer program according to the present technology.

The present technology is directed at capturing a focused image of an iris even under challenging conditions. As illustrated in more detail in the diagram of FIG. 1, the process and system uses a digital camera system 105 having a shutter 106, lens 107, imaging array 108 and data storage device 109 to capture a sequence 110 of illuminated images and dynamically change the focus points 120 for each image frame captured represented by dashed lines 130. The focus points 120 sweep through a sweep range from its far to near end (140a, 140b, respectively) in discrete steps that are selected so that successive frames 130 have partially overlapping depths of field 135 In this way at least one image well focused on the iris of the eye 170 of an individual 175 is guaranteed to exist in the sequence 110. According to one embodiment, the process and system has an operating range 140 such that it is capable of capturing an iris image for an individual positioned within this range.

According to one embodiment, shutter 106 is mechanical and opens and shuts to control exposure and image capture of an image by the imaging array 108. According to another example embodiment, shutter 106 is implemented electronically such that the image array 108 is electronically activated to capture an image at a desired instance. Accordingly, as used herein the term "shutter" means either a mechanical or electronic shutter mechanism or operation.

In one example embodiment, the iris is illuminated with an illumination device 160 that provides multiple illuminations 165, for example a "flash," wherein each illumination 165 is fired for each image captured. Alternatively, the illumination is constant through multiple image acquisitions. The camera sweeps through the entire sweep range, stepping (or continuously moving) its focus from the far to near end. In operation, a controller 180 provides synchronized control signals to the shutter 106, illumination device 160 and image array 108 such as, but not limited to, a charge-coupled device and data storage device 109, such as a solid-state memory and/or magnetic storage system. The illumination device 160 irradiates the subject and photons reflected from the subject and in particular the subject's iris are captured by the image array.

Operating range 140 may be, for example, one to two meters but it is preferred that the sweep range is kept to a minimum for reasons discussed below. For this purpose, an optional range finder device 195 is used to determine the distance of the individual (alternatively referred to as "subject") 175, or the distance of the head, eye or feature of the individual such as a landmark on the face, from the camera lens within the operating range 140. The sweep range may then be set to bracket around the position of the individual, part or feature within the operating range. Alternatively, the operating range many be much smaller, and an individual's head affirmatively positioned a desired distance from the camera lens, for example by providing apparatus, such as a box, or alignment markers to assure a substantially fixed position the head relative to the camera lens.

According to one embodiment, in order to reduce the image memory and communication requirements of the camera system 105 does not start collecting the image sequence until the focus gets within a short distance, e.g., two centimeters, from the estimated location of the eye 170. Likewise, the collection stops when the focus gets sufficiently ahead of the estimated eye location.

Figure 2A:
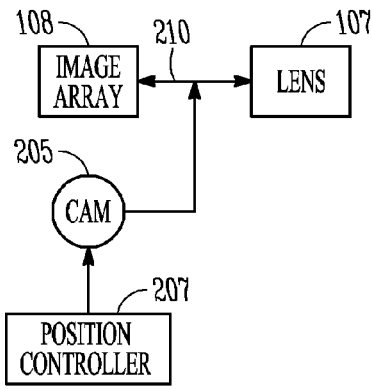
FIGS. 2A, 2B and 2C illustrate several example embodiments for changing the focus of the camera according to the present technology.
Figure 2B:
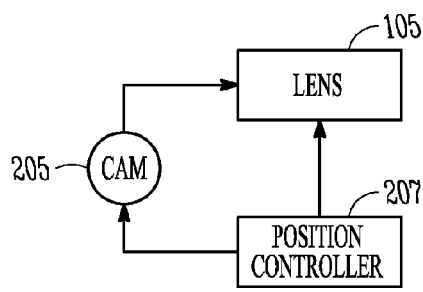
Figure 2C:
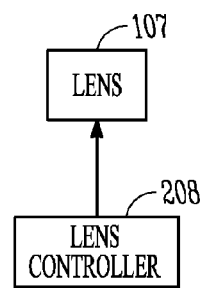

According to one example embodiment, the focus of the camera system 105 may be changed in any one or more of different ways, as illustrated in FIGS. 2A, 2B, and 2C. In one example implementation 200 schematically illustrated in FIG. 2A, camera system 105 includes a mechanical cam 205 that rotates under control of a position controller 207 and changes the distance 210 between the lens 107 and the image array 108, with one revolution of the cam 205 moving the distance through the focus range 140 either by changing the position of the lens 107, image array 108, or both. In one example embodiment, the cam 205 is spring loaded. In another embodiment, the lens is moved by position controller 207 by moving the entire lens as shown in FIG. 2B. Still another way is to use an electronically controlled focusing lens inside the camera objective that can be repositioned by software commands using a focus controller 208, as illustrated in FIG. 2C. Examples of these types of lenses are the Canon EFS lenses. These lenses can be controlled by using software and directly communicating with the lens by using an interface device like the Birger C-mount adapter. The Birger C-mount adapter allows using high quality photographic objectives with electronic focusing capability like Canon or Nikon in conjunction with off-the-shelf C-mount industrial cameras that are sufficiently fast to capture the desired images in the desired time frame. The controller unit 180 in camera system 105 may also operate the position controller 207.

Figure 3:
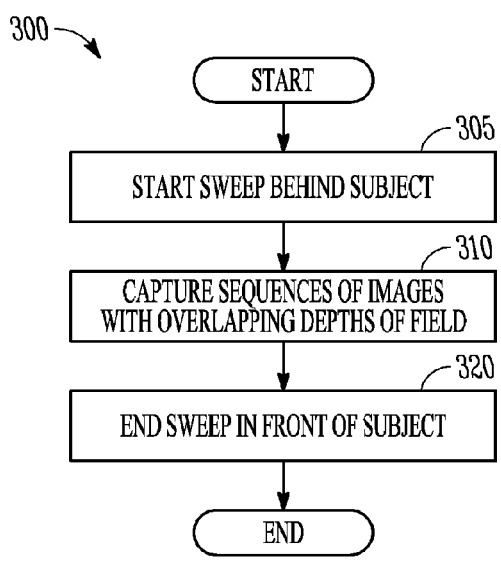
FIG. 3 illustrates a flow-diagram of a method according to the present technology.

As illustrated in flow chart 300 of FIG. 3, to increase the probability of getting images in focus the capturing sequence should be calculated to start in behind the subject (305) and move until it is in front of the subject (320), capturing a sequence of images (310) in-between with the focusing positions of the sequence calculated to overlap each depth of field. While the exact degree of overlap in depth of field is not critical, an overlap of about 5% of each other has been found sufficient for this purpose. For the given camera and lens the sequence of focus points is determined that produces the desired frame sequence. In addition, since most imaging sensors have a limited memory buffer the number of frames that could be stored may not be enough to cover the entire desired operating range. Accordingly, in order to narrow down the sweep range the system finds the distance of the subject (or head, eye or feature of the subject) from the camera lens to within a desired precision in order to establish the start and stop points of the sweep—i.e. the sweep range. In one embodiment, this is performed with an ultrasonic range finder or stereo cameras represented by range finder device 195 in FIG. 1. The sweep range is, in one embodiment, determined based on the accuracy of the range finder so that the sweep starts and stops at points substantially assured to bracket the position of the subject. Alternatively, as noted above, the sweep range can be fixed and the subject positioned within this range.

The starting and stopping positions and the focus positions are, in one example embodiment, optimized for the camera system 105, so there is adequate illumination for each focus position. In one implementation, the illumination device 160 consists of one or more LED or laser diodes that are simultaneously turned on and off by means of control signals sent to the device and synchronized with the lens focus control. In another implementation, the illumination device 160 has a number of illuminators built into it, for example twenty small xenon bulb flashes that are controlled individually and fired as the system moves through its focus sequence. In one embodiment, the firing of the illuminators and the capturing of the images is calculated so as to make sure each image is in the next depth of field window with the desired overlap of depth of field. For the cam operation the speeds of the cam and the illuminators are synchronized. In an electronically controlled focus embodiment, for example using the Canon electronically controlled focus lens, either the lens will be commanded to go from a first point to a second point in a continuous sweep with the frames being captured during the movement or the lens will be commanded to go to individual discrete focus positions for each frame.

According to one example implementation, for a given camera and lens the sequence of focus points that would produce the desired frame sequence is determined. Once the focus points are determined, a mechanism is designed to make the camera sweep through them. For example, focusing the camera at progressively shorter distances can be accomplished by moving its sensor array away from the lens. Theory shows, however, that this movement is not linearly proportional to the object distance. Accordingly, in one example embodiment, the sensor can either move at a constant velocity through the range and take the frames at increasingly longer time intervals, or retain a constant frame period and accelerate the sensor motion as the focus point approaches the near end. Thus, either the frame timing or sensor position sequences must be determined.

Figure 4A:
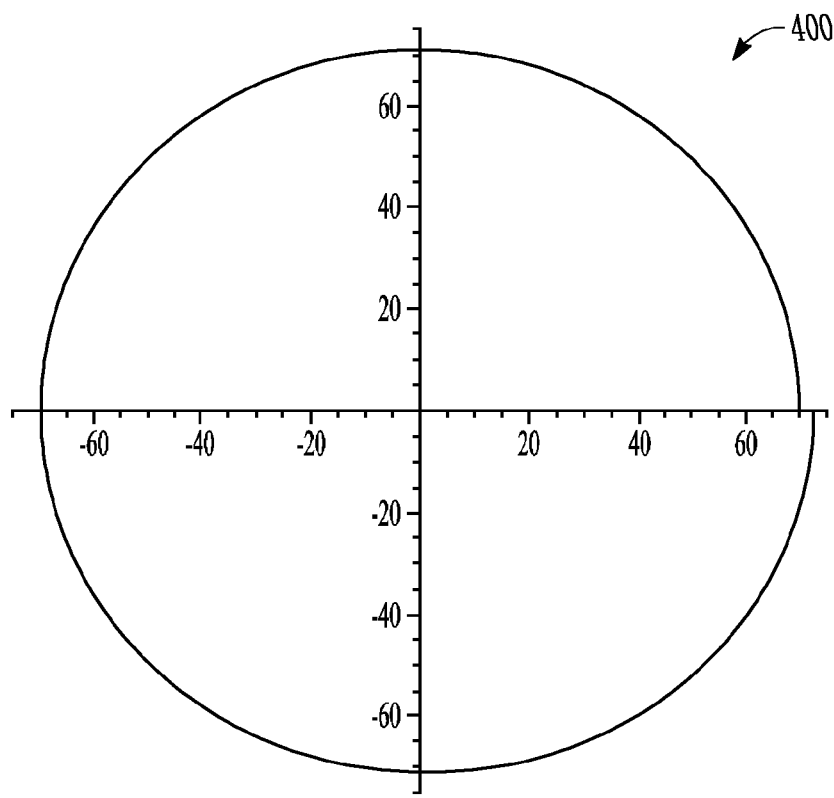
FIGS. 4A, 4B, and 4C illustrate camera designs for changing camera focus according to the present technology.

According to one example embodiment, the sensor movement can be driven by a rotating cam whose profile is shown in FIG. 4A. Its rotation speed is determined according to the exposure time required by each frame.

Figure 4B:
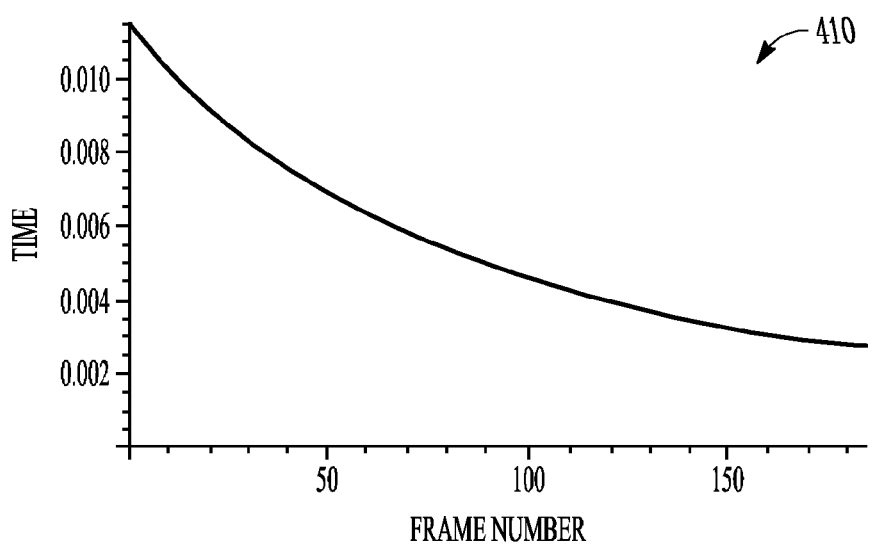

According to another example embodiment, if the sensor moves at a constant speed, then the frames are taken at an increasing rate as the focus point approaches the near end. One example of the relative timing variation (up to a scaling factor, which depends on the exposure time) is plotted in FIG. 4B.

Figure 4C:
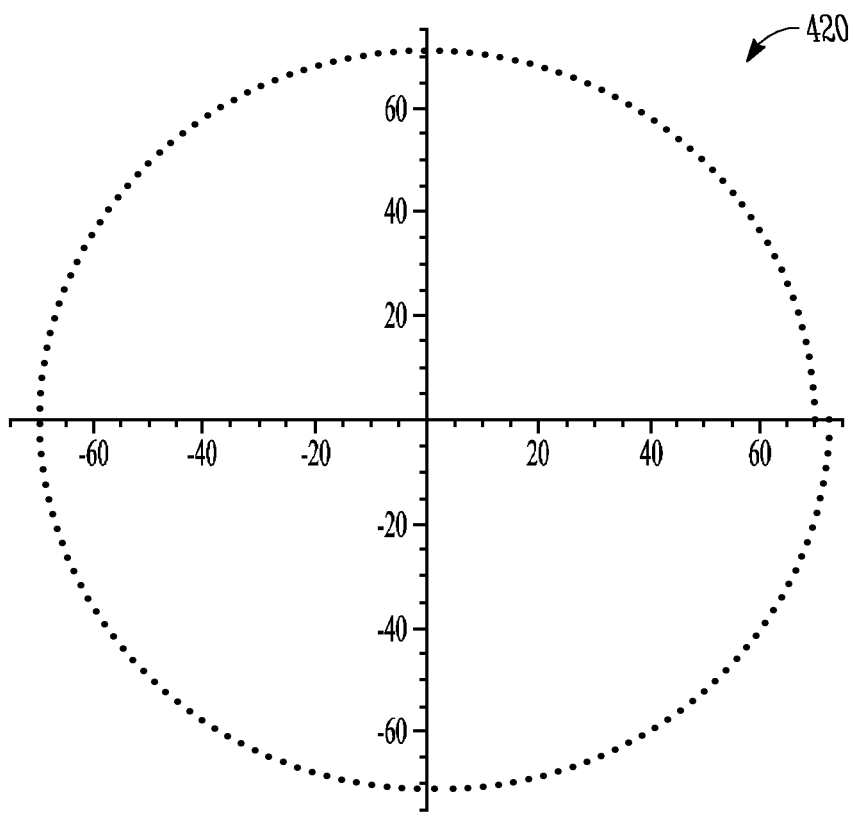

In one embodiment, the cam rotation is synchronized with the camera 212 and the illumination device 160. This is achieved by linking the camera shutter to the cam position. The dots in FIG. 4C mark the cam locations when the sensor array has the right distance from the lens to be focused at a focus point from the focus point sequence and thus the shutter should be set off. According to one embodiment, dots are suitably encoded on the cam along its perimeter, for example using a magnetic strip. In this manner, firing the camera at the right times is decoupled from the cam rotation speed, which is left as an independent parameter, whose value is determined by the needed frame exposure time.

Figure 5:
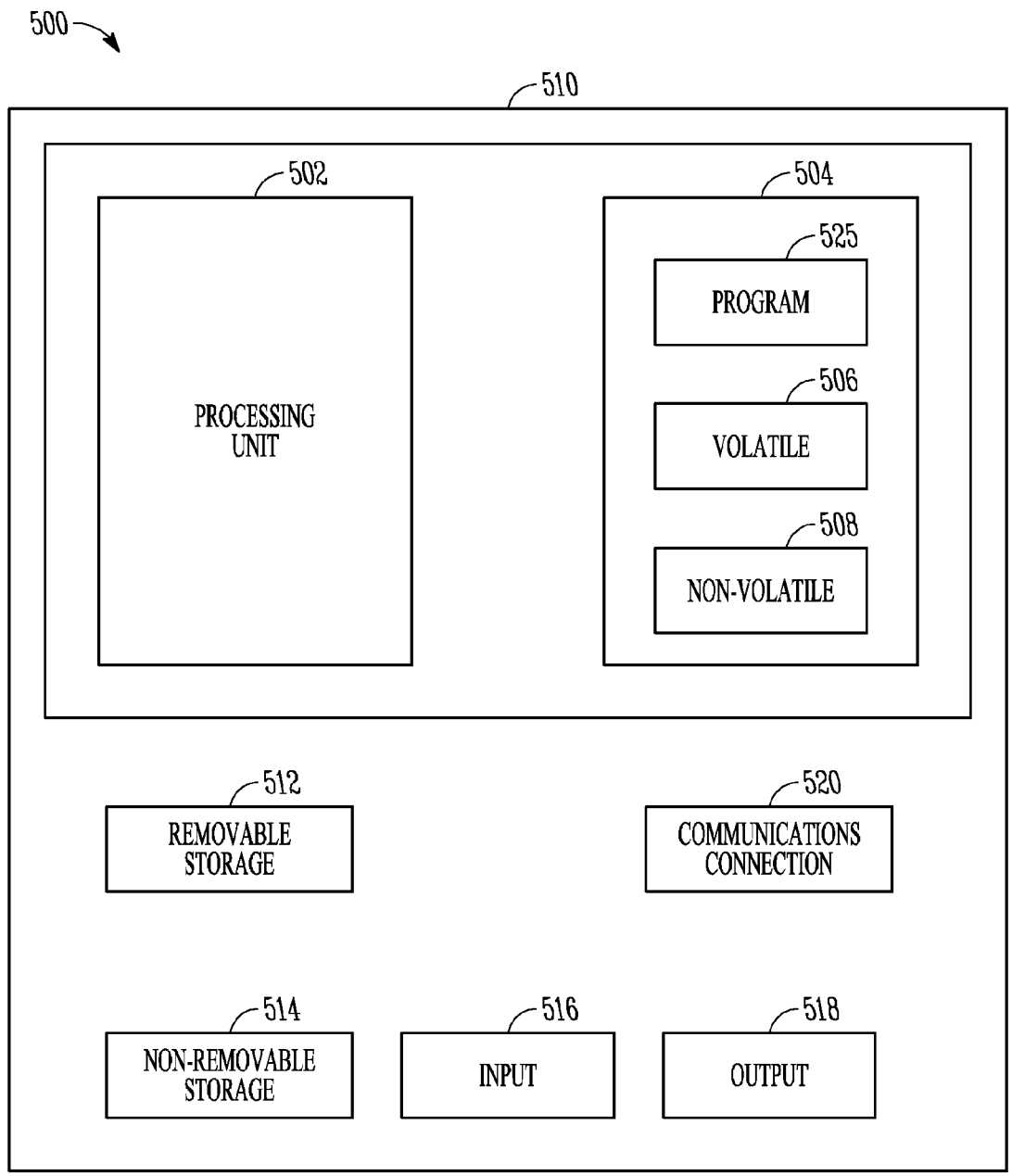
FIG. 5 illustrates an example computer system according to the present technology.

Referring now to FIG. 5, there is illustrated a block diagram of an example embodiment of a computer system 500 that is used for controller 180. According to one embodiment, the processes and functions are implemented in whole or in part using software programs or modules 525 stored and executed on the system 500. System 500 may include one or more general computing devices in the form of computer 510 that, in one example embodiment, includes a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), illumination memory or other memory technologies, compact disc read-only memory (CD ROM), Digital Versatile Disks (DVD) or other optical disk storage, magnetic cassettes, magnetic tape, magnetic disk storage or other magnetic storage devices, or any other tangible and physical medium capable of storing computer-readable instructions.

Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. Computer-readable instructions stored on a tangible and physical computer-readable medium in a non-transitory form are executable by the processing unit 502 of the computer 510. A hard drive, CD-ROM, and RAM are some examples of articles including a computer-readable medium.

According to another example embodiment, the system 500 includes circuits for facilitating conversion of video or image signals into synchronization signals such as sync strippers, signal buffers, frame grabbers, and the like.

In still another example embodiment, system 500 includes one or more computer programs (programs 525) stored in memory or other storage that enable identifying a subject based on the captured iris image for the subject, for example by comparing features of the iris determined from the image with features of known subjects stored in a database, which in turn is stored in one of the memory or storage devices of a computing system 510 within system 500.

The embodiments and examples set forth herein are presented to best explain the present technology and its practical application and to thereby enable those skilled in the art to make and utilize the technology. Those skilled in the art, however, will recognize that the foregoing description and examples have been presented for the purpose of illustration and example only. Other variations and modifications of the present technology will be apparent to those of skill in the art, and it is the intent of the appended claims that such variations and modifications be covered.

The description as set forth is not intended to be exhaustive or to limit the scope of the technology. Many modifications and variations are possible in light of the above teaching without departing from the scope of the following claims. It is contemplated that the use of the present technology can involve components having different characteristics. It is intended that the scope of the present technology be defined by the claims appended hereto, giving full cognizance to equivalents in all respects.

The invention claimed is:

1. A process to capture an image of a subject's iris, wherein the subject has a head and at least one eye including the iris, the head of the subject positioned within an imaging space including three-dimensional volume forming an operating range, the operating range having a near-end plane and a far-end plane, wherein the subject's eye is facing toward the near-end plane of the imaging space, the process comprising:

using a camera to capture a sequence of illuminated images of the subject's head, wherein the images comprise a plurality of frames and are stored in a data storage device for later processing to identify the subject by comparing at least one feature of the subject's iris to iris features of known subjects stored in a database;

dynamically changing the focus point for each image captured by moving the camera so that the focus point sweeps in discrete steps through the operating range so that successive images have overlapping depths of field so that the iris of the subject is within at least one of the depths of field corresponding to a particular image, wherein the camera moves at a constant velocity through the operating range and captures the sequence of illuminated images at increasingly longer time intervals, or the camera moves at an increasing velocity through the operating range and captures the sequence of illuminated images using a constant frame period;

wherein the image containing the iris of the eye of the subject may be associated with any one of the images within the operating range;

further wherein the operating range and overlapping depths of field provide that the at least one image containing the iris is focused on the iris of the eye of the subject;

further wherein at least one image in the operating range contains an image of the iris substantially in focus and useful for identifying the subject using the at least one image of the iris; and processing the at least one image of the iris to identify the subject.

2. A process according to claim 1 further including illuminating one or more of the images with an illumination fired for a respective captured image.

3. A process according to claim 1 wherein the focus point sweeps in discrete steps or continuously across the sweep range.

4. A process according to claim 1 wherein the sweep range is determined at least in part using a range finder to determine a position of the subject so that the sweep range starts and stops a desired distance in front of and behind the subject or a feature or body part of the subject, respectively.

5. A process according to claim 1 further wherein the at least one image of the iris is used to identify the subject.

6. A process according to claim 2 wherein a camera shutter is synchronized with the illuminations.

7. A process according to claim 1 further wherein the overlap of depths of field in successive images is slight.

8. A process according to claim 7 further wherein the slight overlap in depths of field is about 5% overlap.

9. A system for capturing an image of a subject's iris, wherein the subject has a head and at least one eye including the iris, the head of the subject positioned within an imaging space including three-dimensional volume forming an operating range, the operating range having a near-end plane and a far-end plane, wherein the subject's eye is facing toward the near-end plane of the imaging space, the system comprising:

a camera and a lens to capture a sequence of illuminated images of the subject's head, wherein the images comprise a plurality of frames and are stored in a data storage device for later processing to identify the subject by comparing at least one feature of the subject's iris to iris features of known subjects stored in a database;

a control system to produce control signals to control the image exposure and lens so that the camera captures a sequence of images of a subject, wherein the images comprise a plurality of frames and are stored in a data storage device and further wherein the camera and lens are moved so that the focus point for each image is captured so that the focus point sweeps in discrete steps operating range and so that successive images have overlapping depths of field so that the iris of the subject is within at least one of the depths of field corresponding to a particular image, wherein the camera moves at a constant velocity through the operating range and captures the sequence of illuminated images at increasingly longer time intervals, or the camera moves at an increasing velocity through the operating range and captures the sequence of illuminated images using a constant frame period;

wherein the image containing the iris of the eye of the subject may be associated with any one of the images within the operating range;

wherein the operating range and overlapping depths of field provide that the at least one image containing the iris is focused on the iris of the eye of the subject; and further wherein at least one image in the operating range contains an image of the iris substantially in focus and useful for identifying the subject using the at least one image of the iris.

10. A system according to claim 9 further including an illumination device to produce a illumination to illuminate one or more of the images, and further wherein the control system produces a signal to control the illumination device to produce the illumination synchronously with the one or more exposures.

11. A system according to claim 9 wherein the control system produces a control system to control the lens to change the focus point in discrete steps or continuously across the sweep range.

12. A system according to claim 9 further including a range finder and wherein the control systems further receives one or more signals from the range finder to indicate a distance from the camera of the subject or a feature or part of a subject within the operating range of the system, and further wherein the sweep range starts and stops a desired distance in front of and behind the subject or a feature or body part of the subject, respectively.

13. A system according to claim 9 further wherein the control system comprises a computing system including a non-transitory computer program that configures the computing system to cause the control system to produce the control signals.

14. A system according to claim 13 further wherein the control system includes at least one input/output system to produce the control signals or receive signals.

15. A system according to claim 9 further wherein the overlap of depths of field in successive images is slight.

16. A system according to claim 9 further wherein the at least one image of the iris is used to identify the subject.

17. A process according to claim 15 further wherein the slight overlap in depths of field is about 5% overlap.

18. A system for capturing an image of a subject's iris, wherein the subject has a head and at least one eye including the iris, the head of the subject positioned within an imaging Space including three-dimensional volume forming an operating range, the operating range having a near-end plane and a far-end plane, wherein the subject's eye is facing toward the near-end plane of the imaging space, the system comprising:

a camera and a lens to capture a sequence of illuminated images of the subject's head, the sequence of illuminated images comprising a plurality of frames and are stored in a data storage device for later processing to identify the subject;

an illumination device comprising one or more illuminators;

a control system to produce control signals to control the image exposure, illumination device and lens so that the camera captures a sequence of images of a subject, wherein the images comprise a plurality of frames and are stored in a data storage device and further wherein the camera and lens are moved so that the focus point for each image is captured so that the focus point sweeps in discrete steps operating range and so that successive images have overlapping depths of field so that the iris of the subject is within at least one of the depths of field corresponding to a particular image, wherein the camera moves at a constant velocity through the operating range and captures the sequence of illuminated images at increasingly longer time intervals, or the camera moves at an increasing velocity through the operating range and captures the sequence of illuminated images using a constant frame period;

wherein the image containing the iris of the eye of the subject may be associated with any one of the images within the operating range;

wherein the operating range and overlapping depths of field provide that the at least one image containing the iris is focused on the iris of the eye of the subject;

at least one database of iris feature information for a plurality of subjects stored in a memory and/or storage device of a computing system, the database of iris feature information used to identify the subject by comparing the at least one feature of the subject's iris to iris features of known subjects stored in the database;

at least one computer program executing on the computing system to process the at least one image of the iris to identify the subject for whom the iris image has been obtained by reference to the iris feature information in the database; and further wherein at least one image in the operating range contains an image of the iris substantially in focus and useful for identifying the subject using the at least one image of the iris.

19. A system according to claim 18 further wherein the overlap of depths of field in successive images is slight.

20. A process according to claim 19 further wherein the slight overlap in depths of field is about 5% overlap.

* * * * *